United States Patent Office 3,134,190
Patented May 26, 1964

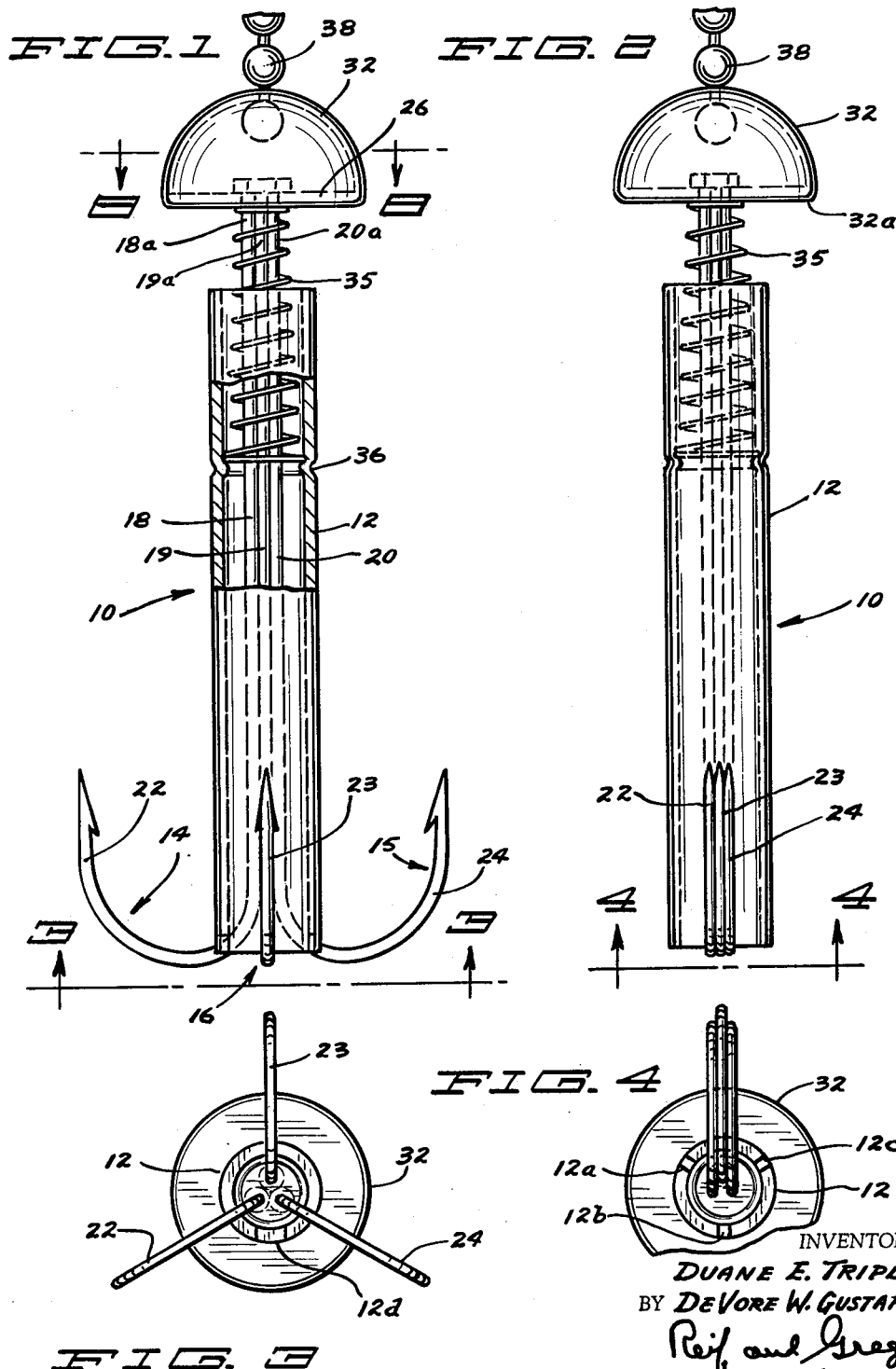

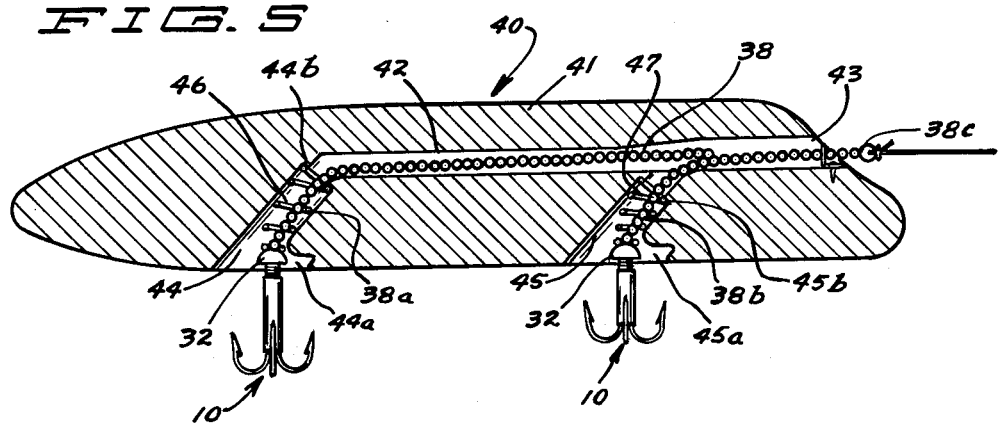
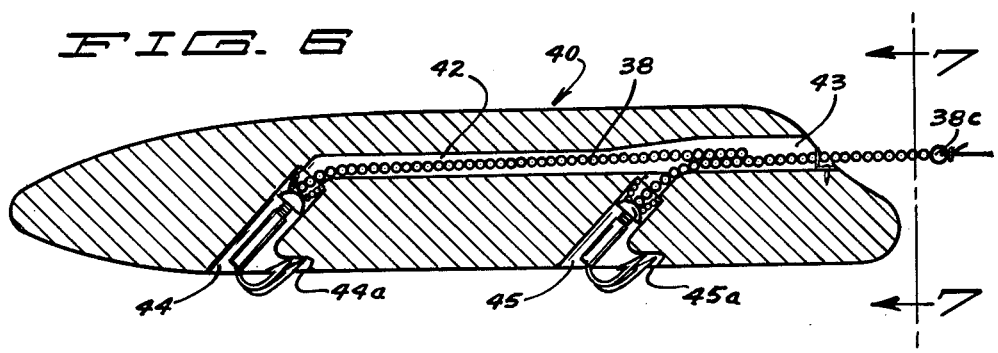
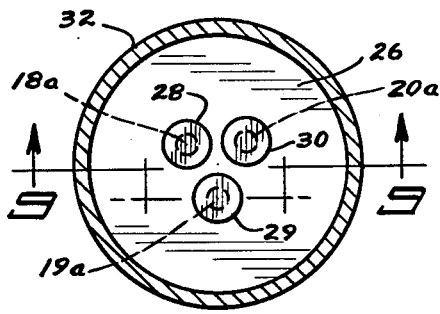
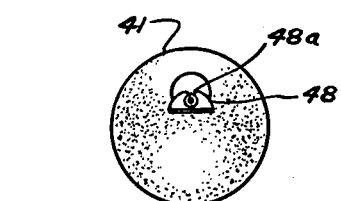
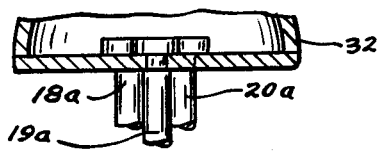

3,134,190
RETRACTABLE LURE AND HOOK STRUCTURE
Duane E. Triplett, 1209 SW. 137th St., Seattle, Wash., and De Vore W. Gustafson, Cokato, Minn.; said Gustafson assignor to said Triplett
Filed Nov. 6, 1961, Ser. No. 150,259
4 Claims. (Cl. 43—44.82)

This invention relates to improvements in the construction of an artificial lure, and more particularly in a retractable lure structure. Further, this invention relates to improvements in the combination of a retractable hook structure in operative association with a retractable lure structure.

It is an object of this invention to provide an artificial lure comprising a body portion so constructed relative to a hook structure in association therewith to releasingly hold said hook in extended or retracted position at the pleasure of the operator.

It is a further object of this invention to provide a hook structure in association with said lure structure, said hook structure comprising a plurality of barbs, and means for releasingly holding said barbs in separated or adjacent positions.

It is a more specific object of this invention to provide an artificial lure having in association therewith a hook structure comprising a sleeve, a plurality of barbs having shanks disposed in said sleeve, and manual operable means for releasingly holding said barbs in separated or adjacent positions radially of said sleeve.

These and other objects and advantages of the invention will be fully set forth in the following description made in connection with the accompanying drawings in which like reference characters refer to similar parts throughout the several views and in which:

FIG. 1 is a view of a portion of applicants' device in elevation on an enlarged scale with a portion thereof being broken away and portions thereof shown in dotted line;

FIG. 2 is a view similar to that of FIG. 1, with a detail thereof shown in a different position;

FIG. 3 is a view in bottom plan taken on line 3—3 of FIG. 1, as indicated by the arrows;

FIG. 4 is a view in bottom plan taken on line 4—4 of FIG. 2, as indicated by the arrows, and having a portion thereof broken away;

FIG. 5 is a view in longitudinal vertical section of applicants' device;

FIG. 6 is a view similar to FIG. 5, with details thereof shown in different position;

FIG. 7 is a view in end elevation taken on line 7—7 of FIG. 6, as indicated by the arrows;

FIG. 8 is a view in horizontal section on an enlarged scale taken on line 8—8 of FIG. 1, as indicated by the arrows; and FIG. 9 is a fragmentary view in vertical section taken on line 9—9 of FIG. 8, as indicated by the arrows.

Referring to the drawings, and more specifically to FIGS. 1-4, 8 and 9, applicants' hook structure is indicated generally by the reference character 10. Applicants' hook structure may comprise specific different detail construction. In this embodiment here presented said hook structure comprises an open-ended tubular sleeve 12 formed of suitable corrosion resistant material. In connection with said sleeve are hooks 14, 15 and 16. Said hooks have shank portions 18, 19 and 20 disposed in said sleeve and having end portions 18a, 19a and 20a extending outwardly of one end thereof and respectively having barb portions 22, 23 and 24 carried at the other ends of said shanks and extending outwardly of the other end of said sleeve.

The extended ends of said hooks are rotatably disposed through a suitable apertured circular disc or plate 26 having nuts 28, 29 and 30 pressed onto the end portions of said shanks extending through said plate whereby said shanks or more generally said hooks 14, 15 and 16 are journaled in said plate 26. Pressed onto said plate 26 and upstanding therefrom is a semi-spherical dome 32 secured as by having its lower run or edge portion 32a crimped about said plate.

Said sleeve 12 will have an inner diameter of a size to nicely accommodate said shanks 18, 19 and 20, and to receive therein disposed about the upper portions of said shanks a coiled spring 35 having its inner end retained by a stop member 36 in the form of a shoulder pressed inwardly of said sleeve 12, as indicated in FIG. 1. The outer end of said spring bears against said plate 26.

Formed in the end of said sleeve which is adjacent said barbs 22, 23 and 24 are circumferentially spaced open-ended notches 12a, 12b and 12c of a size to accommodate said barbs. Said notches are here shown equally spaced apart. Said notches are shown in number to correspond to the number of barbs. It is within the scope of the invention herein to provide a greater number of notches than barbs to vary the spacing between the barbs.

A slot 12d is also provided in said last mentioned end portion of said sleeve 12 having a width sufficient to accommodate all three of the barbs shown to position them adjacent one another. Said spring 35 in urging said plate 26 in a direction away from said sleeve serves to hold said barbs in position in their respective notches or all within said last mentioned notch.

Secured to said cap 32 is a line 38 here indicated in the form of a bead chain shown to be secured to said cap by having a bead disposed therein through an aperture of sufficient size to accommodate the connecting link between adjacent of said beads. This type of fastening is conventional.

With reference to FIGS. 5 and 6, applicants' lure srtucture is shown, of which only one specific embodiment is here shown. Said lure is indicated generally by the reference character 40 and comprises a body portion 41 shown to be substantially cylindrical in form having a tapered forward end portion and a somewhat blunt downwardly inclined rear end portion.

Extending inwardly longitudinally of said body portion 41 is a passageway 42 substantially cylindrical in form and of a size to accommodate the passage of said bead chain 38 through the major portion thereof and of a size to accommodate a double strand of said chain at its rearward or inlet portion 43, which is open to the atmosphere.

At its inner end, said passageway 42 extends into passageway 44 which is inclined forwardly in the direction of the underside of said body portion 41 and having an enlarged outlet portion 44a immediately adjacent the outer side of said body portion 41 and open to the atmosphere. Spaced rearwardly of said passageway 44 is a similar and parallel passageway 45 communicating with said passageway 42 and having an enlarged outlet portion 45a. Said passageways 44 and 45 are shown to be somewhat larger in diameter than said passageway 42 and thus respectively have shoulders 44b and 45b formed at their respective points of juncture with said passageway 42.

Disposed in said passageways 44 and 45 are coiled springs 46 and 47 having their inner ends pressed against said shoulders 44b and 45b, and if desired said inner ends may be secured as by the use of a suitable adhesive.

Said chain 38 is disposed through said passage, as indicated in said FIGS. 5 and 6, and having portions 38a and 38b respectively disposed through said passageways 44 and 45 and through said coiled springs 46 and 47 to have respectively secured to their free ends the fishing hooks 10. Said hooks in the present embodiment of the invention herein are indicated as being identical in structure to the hook structure hereinabove described. Said springs 46 and 47 are shown having their outer ends pressing against said caps 32.

Adjacent the inlet of said passage 43 is a stop member 48 formed as a right angle plate being suitably secured to said body portion 41 as by a small screw and having an open-ended notch 48a in its upstanding plate portion. Embodied in said chain 38 is a large bead 38c which will limit the movement of said chain inwardly of said passageway 43 which will be of a size too large to bypass said stop member 48 and slip into said passageway. Said chain may engage said stop member at any point between adjacent beads by being disposed in said slot 48a. Said chain will be so adjusted that even with said hooks full extended as indicated in FIG. 5, said springs 45 and 46 will be under some degree of compression.

Operation

When applicants' device is not in use, the line 38 will be drawn outwardly of the lure body portion 41 to the point that the hooks 10 are substantially fully received within the passageways 44 and 45 held against the tension of the springs 46 and 47. In this position the barbs 22, 23 and 24 will be moved to be in a side by side position held within the notch 12d, and said barbs thus positioned adjacent one another of said hooks 10 will be respectively received within the recessed portions 44a and 45a. The line 38 will be very nicely and securely held between adjacent beads thereof in the notch 48a of the holding member 48. Thus when handled or carried in a fishing tackle box the barbs of the hooks, and particularly the pointed portions thereof, will be securely held within said recessed portions so there will be no danger present in the handling of the lure, such as snagging a barb into the clothing or body portion of the operator.

When prepared for use, the line 38 will be moved inwardly of the passageway 42 and it will be drawn inwardly by the tension of the springs 46 and 47, which springs will move the hooks 10 outwardly of the body portion 41 into fishing position. By means of the control exercised by the line 38, the hooks may be extended to a greater or lesser degree as may be desired. When said hooks are extended into fishing position, the cap portion 32 will be moved in the direction of the sleeve 12 to move the barb portions 22, 23 and 24 out of the notch 12d. Said barb portions will then be spaced radially relative to said sleeve to be respectively disposed within the notches 12a, 12b and 12c. The cap 32 will then be released and the tension of the spring 35 will hold said barb portions securely within said notches. Thus the hook structures are prepared for fishing. An enlarged bead 38c will be embodied within the line 38 and will be of such a size as not to be able to enter the passageway portion 43. Thus the bead 38c acts as a limit member.

If the barbs of the lure should become snagged during fishing, the line 38 may be disengaged from the holding plate 48 by a sharp jerk which will cause the springs 46 and 47 to snap the hooks 10 forwardly or outwardly and this sudden jerking motion will serve very satisfactorily to release the hooks from a snagged position.

Said passageways 42, 44 and 45 also provide for the passage of water therethrough, and it has been found that said passage of water provides said lure with definite movement characteristics which cause the lure to simulate the movement of a fish.

Thus it is seen that we have provided substantial improvements in an artificial lure relative to the structure of the body of the lure itself and to the structure of the hooks used in operative association therewith.

It will of course be understood that various changes may be made in the form, details, arrangement and proportions of the parts, without departing from the scope of applicants' invention which, generally stated, consists in a device capable of carrying out the objects above set forth, in the parts and combinations of parts disclosed and defined in the appended claims.

What is claimed is:

1. A hook structure in connection with a lure as described comprising a sleeve, a plurality of hooks respectively having shanks and barb portions, the shanks of said hooks being rotatably and slidably mounted within said sleeve and being longer than said sleeve and being disposed therethrough and extending outwardly at one end thereof, the barb portions of said hooks extending outwardly of the other end of said sleeve, a disc having the extended ends of said shanks rotatably secured therein, a coiled spring about said shanks having one end abutting said disc and having its other end retained within said sleeve urging said sleeve axially of said shanks to engage said barb portions, said sleeve having spaced notches at its said other end whereby said barb portions are respectively engaged by said notches and held therein in circumferentially spaced relation under the tension of said spring, and one of said notches being adapted to engage all of said barb portions therein.

2. A hook structure comprising a plurality of hooks respectively having shanks and barb portions, a sleeve, the shanks of said hooks being rotatably and slidably disposed in said sleeve and being of greater length than said sleeve to extend outwardly of one end of said sleeve, the barb portions of said hooks extending outwardly of the other end of said sleeve, means outwardly of said sleeve rotatably retaining the respective extended ends of said shanks, and spring means urging said last mentioned means axially away from said sleeve to hold said barb portions under tension in engagement with said other end of said sleeve.

3. A hook structure comprising a plurality of hooks respectively comprising a shank and a barb portion, a sleeve, said shanks being rotatably and slidably disposed in said sleeve and having a greater length than said sleeve to extend outwardly of one end thereof, a cap, said extended ends of said shanks being rotatively secured in said cap, said barb portion extending outwardly of the other end of said sleeve, said sleeve having spaced notches at said other end thereof, said notches save one respectively retaining said barb portions in circumferentially spaced relation, said one notch retaining all of said barbs in closely adjacent relation therein, and resilient means holding said cap and said sleeve in axially spaced relation to retain said barbs in said notches under tension.

4. The structure set forth in claim 3, said resilient means comprising a coil spring anchored at one end in said cap and at its other end within said sleeve.

References Cited in the file of this patent

UNITED STATES PATENTS

| | | |
|---|---|---|
| 463,240 | Zuckweiler | Nov. 17, 1891 |
| 470,279 | Zuckweiler | Mar. 8, 1892 |
| 973,119 | Lisch | Oct. 18, 1910 |
| 1,355,858 | Smith | Oct. 19, 1920 |
| 2,152,275 | Parkins | Mar. 28, 1939 |
| 2,581,485 | Herkenham | Jan. 8, 1952 |
| 2,589,435 | Roeben | Mar. 18, 1952 |
| 2,602,689 | Matz | July 8, 1952 |
| 2,611,207 | Pond | Sept. 23, 1952 |
| 2,711,611 | Miner | June 28, 1955 |
| 2,775,060 | Barker | Dec. 25, 1956 |
| 2,783,580 | Balboni | Mar. 5, 1957 |